3,697,291
FURANONE MEAT FLAVOR COMPOSITIONS
Christiaan Herman Theodoor Tonsbeek, Orpington, Kent,
England, assignor to Lever Brothers Company, New
York, N.Y.
No Drawing. Filed Sept. 18, 1968, Ser. No. 760,700
Claims priority, application Great Britain, Sept. 22, 1967,
43,364/67
Int. Cl. A23l 1/26
U.S. Cl. 99—107                    11 Claims

ABSTRACT OF THE DISCLOSURE

Improved meaty foodstuff in which the flavour of a meaty product or a meat simulating product is improved by the incorporation of 2,5-dimethyl- or 5-methyl-4-hydroxy-2,3-dihydrofuran-3-one or a precursor of these compounds.

---

The invention relates to processes for imparting a meaty flavour to certain foodstuffs or improving such flavour and to concentrated as well as ready-for-use foodstuffs obtained according to the process.

It has been proposed to improve the flavour of various foodstuffs which contain meat or a meat simulating product, by adding certain components such as protein hydrolysate, monosodium glutamate, 5'-nucleotides, organic carboxylic acids and the like. Although the products thus obtained often possess a meaty taste, their odour usually is not satisfactory.

It has now been found that a meaty flavour can be enhanced or imparted to foodstuff which contains meat or a meat simulating product by the incorporation of certain furanones.

Accordingly the present invention provides a foodstuff comprising a meat product or a meat simulating product and a 4-hydroxy-2,3-dihydrofuran-3-one of the general formula:

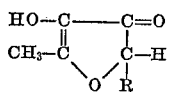

in which R represents —H or —CH$_3$. The dihydrofuranone may be incorporated as such, or in the form of precursors or reactants yielding the desired compound after completion of the preparation of the foodstuff in a form ready for consumption.

The general formula covers two compounds, which are known in the literature viz. 2,5-dimethyl-4-hydroxy-2,3-dihydrofuran-3-one and 5-methyl-4-hydroxy-2,3-dihydrofuran-3-one.

A preparative method for the 2,5-dimethyl compound has been described in U.S. specification 2,936,308 to John E. Hodge in Example 2 and Table 2, by conversion of L-rhamnose in the presence of piperidine and acetic acid.

A preparative method for 5-methyl-4-hydroxy-2,3-dihydrofuran-3-one (II) has been described in Zeitschrift für Lebensmittel-Untersuchung und-Forshung, volume 134 of Aug. 10, 1967, pp. 230 to 232, by reaction of an aldopentose with primary amines in aqueous media.

An improved method of preparing these compounds as described in Dutch patent specification 6712748 filed Sept. 18, 1967, involves converting N.N-disubstituted glycosyl amines derived from an aldopentose or a 6-desoxy hexose by means of the action of a suitable organic carboxylic acid in a suitable solvent.

The process according to the invention relates as stated to imparting a meaty flavour to foodstuffs which contain meat or a meat simulating product or improving such flavour. Under such foodstuffs are to be understood here foods ready for consumption and concentrated foodstuffs in which a meaty flavour is desired such as soups including concentrated canned soup and dry soup mixes, preserved meals, rissoles, preserved meat e.g. canned ham, simulated meat gravy, gravy tablets or cubes, and "powdered flavour" such as that which may be sprinkled over meaty foodstuffs shortly before consumption.

Both the furanones involved show keto-enol tautomerism, but it appears that they normally occur in the structure represented in the structural formula given above.

This appears from infrared and nuclear magnetic resonance spectra and they also show the characteristic colour reaction with Fe III chloride. Theoretically however it may be expected that the substances occur in mixtures in which other structures such as the double keto, double enol and another keto-enol form play a role. By special techniques mixtures may be obtained in which these other forms occur predominantly. According to the present invention also these other tautomeric forms or mixtures thereof can be incorporated in foodstuffs as to obtain a meaty flavour.

In another embodiment precursors or reactants are incorporated, which during the preparation of the ready-for-use product are converted into the 2,3-dihydrofuran-3-one. Thus e.g. esters like the acetates may be used. Furthermore it has been found that after heating for prolonged periods as e.g. occurs during sterilization of canned soups the furan-3-one can be formed from e.g. pentose 5 phosphates and compounds such as pyrrolidone carboxylic acid or taurine.

As the type of foodstuffs which can be improved as to flavour according to the invention varies widely, the concentrations in which the 2,3-dihydrofuran-3-ones are applied also ranges widely. When incorporating 5-methyl-4-hydroxy-2,3-dihydrofuran-3-one good results are obtained at levels varying from 0.5 to 100 parts per million calculated on the foodstuff in the ready-for-consumption form; best results are obtained in the range from 2 to 25 parts per million. When incorporating 2,5-dimethyl-4-hydroxy-2,3-dihydrofuran-3-one good results are obtained at levels varying from 0.05 to 50 parts per million; best results are obtained in the range from 0.1 to 20 parts per million. As this substance is a stronger flavouring agent than the monomethyl homologue it is quite possible to use it at lower concentrations as from 0.05 to 0.5 p.p.m. especially when combined with the other compound. As these concentrations apply in the case of foods ready for consumption it is obvious that where more concentrated foodstuffs such as e.g. canned concentrated soups, dry soup mixes and seasoning compositions are involved appreciably higher concentrations may be used, dependent on the degree of dilution they undergo during preparation.

The relative weight ratios where both compounds are used together also depends on the foodstuff involved but in the case of soup or soup products the dimethyl compound is generally used in quantities ranging from 1/10 to 9/10 of the quantity by weight of the monomethyl compound present.

Where precursors or reactants which are converted into the desired compounds are used the quantities incorporated are generally higher than those indicated above in order to overcome the effects of the reaction not taking place quantitatively.

The substances incorporated according to the invention are not quite stable against oxidative attack and oxidation and decomposition products may also contribute appreciably to the desired flavour. For storage it may therefore be desirable to prepare the 2,3-dihydrofuran-3-ones in a stabilized form as e.g. encapsulated or coated with another material. Also, operation in an inert atmosphere may be feasible.

In order to obtain products with a fuller meaty taste and flavour the 2,3-dihydrofuran-3-ones may be utilized together with other substances as e.g. one or more compounds from the following classes of substances. Preferred mixtures are combinations of compounds mentioned under classes I, II and III, together with a 4-hydroxy 2,3-dihydrofuran-3-one.

(I) Amino acids which may be obtained simply by hydrolysis, autolysis or fermentation or by combination of these from vegetable or animal proteins such as gluten, casein, soyabean protein and the like.

(II) Nucleotides, such as adenosine-5'-monophosphate, guanosine-5'-monophosphate, inosine-5'-monophosphate, xanthosine - 5' - monophosphate, uridine-5'-monophosphate, cytidine-5'-monophosphate, and their amides, desoxy derivatives, salts etc. Combinations of several nucleotides as e.g. of guanosine-5'-monophosphate and inosine-5'-monophosphate are particularly suitable.

(III) Carboxylic acids such as lactic acid, glycolic acid and β-hydroxy butyric acid on one hand and dicarboxylic acids as succinic acid, glutaric acid and the like on the other hand, and especially mixtures in which succinic acid and lactic acid occurred in weight ratios of 1:30 to 1:150.

(IV) Pyrrolidone carboxylic acid or precursors thereof.

(V) Peptides such as e.g. alanyl-alanine, alanyl-phenylalanine, alanyl-asparagine, carnosine, anserine.

(VI) Sweetening substances, both artificial, like e.g. saccharine or cyclamates, and natural, particularly mono- and disaccharides.

(VII) Substances with the flavour of meat or broth, particularly sulphur containing compounds, such as e.g. reaction products of amino acids like cysteine/cystine with reducing sugars, ascorbic acid etc., reaction products of hydrogen sulphide with lower aliphatic aldehydes and ketones (e.g. propionaldehyde, crotonaldehyde, methional, mercaptoacetaldehyde).

(VIII) Other volatile sulphur compounds, such as $H_2S$, mercaptans, disulphides and sulphides, such as e.g. dimethyl sulphide and diallyl sulphide.

(IX) Guanidines, such as e.g. creatine and creatinine.

(X) Salts, such as e.g. NaCl and phosphates, particularly, in connection with the pH so-called acid phosphates like $Na_2HPO_4$, $NaH_2PO_4$ or other alkali or ammonium phosphates and organic phosphates, such as e.g. phosphorus containing amino acids. However, it is by no means necessary to incorporate phosphates.

(XI) Nitrogen compounds, such as ammonia, amines, urea, indole, skatole, etc.

(XII) Saturated or unsaturated carboxylic acids with e.g. 2 to 12 carbon atoms.

(XIII) Saturated or unsaturated higher hydroxycarboxylic acids and γ and s-lactones derived therefrom, such as e.g. deca- and dodeca-5-olide; 2,3-dimethyl-2,4-alkadiene-4-olides, etc.

(XIV) Lower saturated and unsaturated aldehydes, e.g. acetaldehyde, propion-aldehyde, iso-butyraldehyde, hepten-4-al, etc.

(XV) Lower saturated and unsaturated ketones, such as acetone, butanone, diacetyl, etc.

(XVI) Tricholomic acid and ibotenic acid or their salts.

(XVII) Optionally aromatic carboxylic and/or heterocyclic compounds, such as e.g. ortho amino-acetophenone, N-acetonyl pyrrole, maltol, isomaltol, ethyl maltol, lenthionine, hypoxanthine, guanine, inosine, guanosine, etc.

(XVIII) Lower saturated and unsaturated alcohols, such as ethanol, octanol.

(XIX) Colouring substances, such as e.g. curcuma, caramel.

(X) Thickening agents such as gelatin and starch.

The dosage of these optional ingredients is dependent on the kind of flavour one wishes to imitate and moreover on the nature of the foodstuff to which the ingredients are added and the other ingredients added, such as herbs and spices.

By way of illustration the following examples are given to elucidate the invention.

EXAMPLE 1

Two samples were prepared imitating broth. The first sample consisted of 7 g. sodium chloride and 5 g. commercial beef extract, dissolved in 1 litre water. The second sample was prepared in a similar way but contained also 0.010 g. 5-methyl-4-hydroxy - 2,3 - dihydrofuran-3-one (M.P. 126.5–127.5° C.). After heating both samples to the desired temperature a panel was requested to taste both compositions and to indicate a preference. The panel consisted of 18 persons, of which 15 preferred the composition which contained the 2,3-dihydrofuran-3-one.

EXAMPLE 2

A flavouring composition imitating beef broth was prepared by dissolving the following ingredients in water:

|   | G. |
|---|---|
| Lactic acid | 2.00 |
| Inosine-5'-monophosphate | 0.10 |
| Succinic acid | 0.08 |
| Monosodiumglutamate | 4.00 |
| Casein hydrolysate | 4.00 |
| Tartaric acid | 0.10 |
| Creatine | 0.05 |
| Sodium chloride | 26.00 |

Further water was added until a volume of slightly less than 4 litres was obtained and the pH of the solution was adjusted to 5.8 by means of adding 0.1 N sodium hydroxide.

The solution was divided into two parts, each equalling 2 litres and to one of these a quantity of 0.010 g. 5-methyl-4-hydroxy-2,3-dihydrofuran-3-one M.P. 126.5–127.5° C. (II) was added. Furthermore a reference beef broth sample was prepared by boiling 500 g. lean beef for 2.5 hours in two litres of water in which 13 g. sodium chloride had been dissolved. After cooling the beef was removed by filtration and a clear broth was obtained. The three samples described above were heated and a tasting panel consisting of 29 persons was requested to determine which of the two artificial mixtures resembled the beef broth sample more closely. 23 persons indicated that according to them the sample containing the dihydrofuranone resembled the flavour of beef broth most.

EXAMPLE 3

A "concentrated" beef broth was prepared by boiling 1 kg. of shin of beef in 4 litres of water for 3 hours. After removal of the beef by filtration the broth was divided into three parts. The first part consisted of approximately 2 litres of "concentrated" broth and served as a reference sample in testing. The second part consisted of approximately 1 litre concentrated broth and was diluted with 1 litre of water. The third part consisted of approximately 1 litre concentrated broth, was diluted with 1 litre of water and 0.010 g. of 5-methyl-4-hydroxy-2,3-dihydrofuran-3-one (II) (M.P. 126.5–127.5° C.) was added.

The three samples described above were heated and a tasting panel of 28 persons was requested to determine which of the two diluted broth samples resembled as to their flavour the reference concentrated broth sample more closely. Twenty-two persons of the panel thought that the sample containing the furanone (II) resembled the concentrated broth more closely.

EXAMPLE 4

Two artificial broth compositions were prepared by dissolving the following ingredients in water:

|  | Grams Solution A | Grams Solution B |
| --- | --- | --- |
| Lactic acid | 1.5 | 1.5 |
| Casein hydrolysate | 3.5 | 3.5 |
| Monosodiumglutamate | 2.0 | 2.0 |
| Succinic acid | 0.06 | 0.06 |
| Phosphoric acid | 0.6 | 0.6 |
| Inosine-5'-monophosphate | 0.05 | 0.05 |
| Guanosine-5'-monophosphate | 0.04 | 0.04 |
| Sodium chloride | 13.0 | 13.0 |
| 2,5-dimethyl-4-hydroxy-2,3-dihydro-furan-3-one |  | 0.0006 |

The pH of both solutions was adjusted to 5.7 by means of adding a sodium hydroxide solution after which to both A and B water was added until a volume of 2 litres was reached.

Furthermore a reference broth was prepared by boiling 500 g. beef in 2 liters water containing 13 g. sodium chloride for 2.5 hours. After allowing to cool the beef was removed by filtration and a clear broth obtained.

After heating the three broth samples to the desired temperature a panel consisting of 24 persons was requested to determine whether A or B resembled the beef broth best. Twenty members of the panel stated that they thought that B resembled beef broth more closely.

EXAMPLE 5

A basis for canned soups was prepared by adding the following ingredients to 4 liters water:

| | G. |
| --- | --- |
| Chopped boiled well done beef | 250 |
| Tallow | 100 |
| Vermicelli | 250 |
| Sodium chloride | 80 |
| Dried cut carrots | 30 |
| Dried leek | 25 |
| Monosodiumglutamate | 15 |
| Casein hydrolysate | 5 |
| Pepper | 1.2 |
| Bay-leaf | 0.2 |

An artificial broth composition was prepared by dissolving the following ingredients in water:

| | G. |
| --- | --- |
| Lactic acid | 35.0 |
| Succinic acid | 0.8 |
| Inosine-5'-monophosphate | 1.1 |
| Guanosine-5'-monophosphate | 0.8 |
| Pyrrolidone carboxylic acid | 4.5 |
| Creatine | 1.0 |
| 2,5-dimethyl-4-hydroxy 2,3-dihydrofuran-3-one | 0.2 |

The pH of this solution was adjusted to 5.9 and water was subsequently added as to obtain a volume of 2 litres. Two samples of concentrated soup were prepared using the above mentioned basis for soups and the artificial broth. The first sample was prepared by adding to 400 ml. of the soup basis 20 ml. of the artificial broth and 80 ml. water. The second sample was prepared by adding to 400 ml. soup basis, 20 ml. artificial broth, 75 ml. water and 5 ml. of an aqueous solution containing 1.25 mg. 5-methyl-4-hydroxy 2,3-dihydrofuran-3-one (M.P. 126.5–127.5° C.) per ml. The mixtures obtained were canned in 0.5 litre tins and sterilized in an autoclave.

A soup ready for consumption was prepared by adding to the contents of each tin an equal volume water. After heating both soups were served to a panel consisting of 32 persons for organoleptic testing. Twenty-three members of the panel indicated a preference for the soup which contained both 2,3-dihydrofuran-3-ones.

EXAMPLE 6

In a similar way as described in the previous example a basis for soups was prepared. Also a similar artificial broth composition was prepared, which contained 0.600 g. 5-methyl-4-hydroxy-2,3-dihydrofuran-3-one instead of 0.2 g. of the 2,5-dimethyl homologue. The pH was adjusted to 5.8 and water was added to obtain a volume of 2 litres. The first sample was prepared by adding to 400 ml. soup basis 20 ml. artificial broth and 80 ml. water. The second sample by adding to 400 ml. soup basis 20 ml. artificial broth, 70 ml. water and 10 ml. of a solution containing 2,5-dimethyl-hydroxy-2,3-dihydrofuran-3-one in a quantity of 0.21 mg. per ml. The mixtures were canned in 0.5 litre tins and steriilzed. Soups ready for consumption were prepared by adding to the contents of each tin an equal volume of water. After heating both soups were served to a panel consisting of 26 persons for organoleptic testing. Nineteen members of the panel indicated a preference for the soup which contained both 2,3-dihydrofuran-3-ones.

EXAMPLE 7

A basis composition of a dry soup mix was prepared by mixing.

| | G. |
| --- | --- |
| Sodium chloride | 90 |
| Monosodiumglutamate | 20 |
| Tallow | 50 |
| Vermicelli | 200 |
| Dried beef | 60 |
| Casein hydrolysate | 20 |
| Dried onions | 30 |
| Dried carrots | 10 |
| Herbs | 4 |

A preparation of 2,3-dihydrofuran-3-one(II) which can be dosed easily was prepared by dissolving 1 g. 5-methyl-4-hydroxy-2,3-dihydrofuran-3-one (M.P. 126.5–127.5° C.) in 40 ml. of a 50% aqueous dextrine-maltose solution and freeze drying this solution. The powder thus obtained contains 2,3-dihydrofuran-3-one(II) and dextrine maltose in a weight ratio of 1:20.

Two samples were prepared subsequently. The first by mixing 100 g. of the dry soup mix with 2 litres of water and boiling after addition of 0.20 dextrine maltose. The second sample was prepared in the same way, however instead of dextrine maltose the powder containing furanone (II) and dextrine maltose was added in a quantity of 0.20 g. After heating the samples to the correct temperature they were compared as to flavour by a panel of 41 persons, of which 28 preferred the 2,3-dihydrofuran-3-one containing soup.

EXAMPLE 8

A basis composition of a dry soup mix was prepared as described in the previous example.

A preparation of 2-5-dimethyl-4-hydroxy-2,3-dihydrofuran-3-one which can be dosed easily was prepared by dissolving 1 g. of the 2,3-dihydrofuran-one (M.P. 79.5–80.5° C.) in 80 ml. of a dextrine maltose solution in water of 50% solids content. The solution was freeze-dried and the product contained the furanone and dextrine maltose in a weight ratio of 1:40.

Two samples were prepared subsequently. The first by mixing 100 g. of the above mentioned dry soup mix with 2 litres of water and boiling after addition of 0.120 g. dextrine maltose. The second one also from 100 g. soup mix and 2 litres of water and boiling after addition of 0.120 g. of the furnanone dextrine maltose preparation. After heating the samples to the desired temperature they were compared as to flavour by a panel of 36 persons, of which 26 preferred the soup containing the 2,5-dimethyl-4-hydroxy-furan-3-one.

EXAMPLE 9

A beef broth was boiled from 250 g. beef and 1 litre water. After boiling for 2.5 hours and allowing to cool the beef was separated from the "concentrated" broth by filtration. The concentrated broth was divided into two equal parts, one of which was set aside for the preparation of a reference sample ragout whereas the other was diluted with an equal volume of water. Thus was 1 litre of dilute broth obtained, which was divided into two parts of each 500 ml. To one of these quantities of dilute broth 3.75 mg. of 5-methyl-4-hydroxy-2,3-dihydrofuran-3-one dissolved in 3 ml. water were added.

From each of the 500 ml. portions of broth a ragout was prepared for which the following ingredients were used:

| | G. |
|---|---|
| Margarine | 50 |
| Flour | 50 |
| Beef | 10 |
| Sodium chloride | 3 |
| Monosodiumglutamate | 1 |
| Pepper | 0.01 |
| Curcuma | 0.02 |

The margarine was molten, the flour added and the mixture was stirred with the heated broth. The ragout was finished with the other ingredients. The beef was done well, chopped and added to the mixture. After heating the three ragouts were tested as to their organoleptic properties by a panel consisting of 24 persons. The members of the panel were requested to indicate which of the two ragouts prepared from diluted broth resembled more closely the ragout prepared from the concentrated broth. Nineteen members of the panel preferred the sample which contained the furanone (II).

EXAMPLE 10

A gravy was prepared from the following ingredients:

| | G. |
|---|---|
| Gelatin | 4.0 |
| Tomato puree | 5.0 |
| Tallow | 15.0 |
| Sodium chloride | 6.0 |
| Powdered carrots | 1.0 |
| Powdered onions | 1.0 |
| Casein hydrolysate | 1.0 |
| Curcuma | 0.1 |
| Pepper | 0.06 |
| Bay-leaf | 0.04 |
| Clove | 0.03 |
| Water, 1 litre. | |

The gelatin was soaked in part of the water. The remainder of the water was heated and the other ingredients added, and finally the dissolved gelatin was added. Thus a basis for gravy was obtained.

Furthermore a solution of the following ingredients in water was prepared:

| | G. |
|---|---|
| Sodium chloride | 10.0 |
| Monosodiumglutamate | 10.0 |
| Casein hydrolysate | 10.0 |
| Lactic acid | 15.0 |
| Succinic acid | 0.4 |
| Inosine-5'-monophosphate | 0.6 |
| Fumaric acid | 0.5 |
| Taurine | 1.0 |
| Guanosin-5'-monophosphate | 0.5 |
| 5-methyl-4-hydroxy-2,3-dihydrofuran-3-one | 0.1 |

The pH of this solution was adjusted to 6.0 and subsequently water was added to obtain a volume of 1 litre.

To the gravy basis mentioned earlier 100 ml. of the flavouring composition described above was added. After heating this gravy was tested organoleptically by a panel of 23 persons. The panel members almost unanimously stated that the gravy tested like an excellent beef gravy.

EXAMPLE 11

A gravy was prepared from the following ingredients:

| | G. |
|---|---|
| Gelatin | 4.0 |
| Tomato puree | 5.0 |
| Tallow | 25.0 |
| Sodium chloride | 6.0 |
| Powdered carrots | 1.5 |
| Powdered onions | 1.5 |
| Casein hydrolysate | 2.0 |
| Curcuma | 0.1 |
| Pepper | 0.06 |
| Bay-leaf | 0.04 |
| Cloves | 0.04 |
| Water, 1 litre. | |

The gelatin was soaked in part of the water. The remainder of the water was heated and the other ingredients added and finally the dissolved gelatin was added. Thus a basis for gravy was obtained.

Furthermore a solution of the following ingredients in water was prepared:

| | G. |
|---|---|
| Sodium chloride | 10.0 |
| Monosodiumglutamate | 15.0 |
| Casein hydrolysate | 10.0 |
| Lactic acid | 20.0 |
| Succinic acid | 0.3 |
| Inosine-5'-monophosphate | 0.6 |
| Guanosine-5'-monophosphate | 0.5 |
| 2,5-dimethyl-4-hydroxy-2,3-dihydro-furan-3-one | 0.022 |

The pH of this solution was adjusted to 6.0 by addition of sodium hydroxide solution and subsequently water was added to a volume of 1 litre.

To the gravy basis mentioned earlier 100 ml. of the flavouring composition described above was added. After heating this gravy was tested organoleptically by a panel and was qualified as an excellent gravy.

EXAMPLE 12

A mixture of flavouring compounds in powder was prepared by mixing the following ingredients:

| | G. |
|---|---|
| Casein hydrolysate | 20 |
| Monosodiumglutamate | 35 |
| Inosine-5'-monophosphate | 1.3 |
| Guanosine-5'-monophosphate | 1.1 |
| Monosodium succinate | 0.8 |
| Sodium chloride | 20.0 |

The mixture thus obtained served as the basis for seasoning compositions.

Finally 1 g. of 5-methyl-4-hydroxy-2,3-dihydrofuran-3-one were added to the mixture. This compound was added in the form of a powdered mixture of dextrine mallose and the 2,3-dihydrofuran-3-one (II) (weight ratio 20:1) cf. Ex. 7. After mixing thoroughly the composition was finely ground and put in sprinklers. A panel of 32 persons were of the opinion that the addition of this seasoning improved both the taste and odour of soups and gravies.

EXAMPLE 13

A basis for seasoning compositions was prepared as described in the previous example. To this mixture was added 0.5 g. of 2,5-dimethyl-4-hydroxy-2,3-dihydrofuran-3-one (M.P. 79.5–80.5° C.) in the form of a dried mixture with dextrine maltose (weight ratio furanon:dextrine maltose 1:40). After mixing thoroughly the mixture was finely ground and put in sprinklers. A panel was unanimously of the opinion that the addition of this seasoning improved both taste and flavour of soups.

EXAMPLE 14

Fibres spun from soya protein were thoroughly washed and cut into pieces. The pieces thus obtained were chopped and mixed with water in a household mixer and subsequently boiled with water for 15 minutes. After cooling excess water was removed and the product pressed in a cloth. To 100 g. of this product were added:

|  | G. |
|---|---|
| Pasteurized egg white | 20 |
| Sodium chloride | 1 |
| Caramel dye | 0.25 |
| Casein hydrolysate | 0.050 |
| Monosodiumglutamate | 0.200 |
| Sodium lactate | 0.300 |
| Succinic acid | 0.005 |
| Inosine-5'-monophosphate | 0.010 |
| Guanosine-5'-monophosphate | 0.008 |
| Dextrine maltose | 0.015 |

Another sample of synthetic meat was prepared in the same way, however also adding 0.020 g. of the dextrine maltose-dihydrofuran-3-one composition described in Example 7.

Each of the samples was subsequently pressed into an artificial sausage casing and coagulated by boiling in water for 30 minutes. Both samples were then tested for their organoleptic properties by a panel consisting of 26 persons of which 18 persons preferred the 2,3-dihydrofuran-3-one containing synthetic meat.

EXAMPLE 15

A synthetic meat from soyabean protein was prepared as described in the previous example without adding a 2,3-dihydrofuran-3-one.

In a similar way a second sample of synthetic meat was prepared, to which instead of 0.015 g. dextrine maltose 0.010 g. of a quantity of a composition consisting of dextrine maltose and 2,5-dimethyl-4-hydroxy-2,3-dihydrofuran-3-one was added.

Each of the two samples was subsequently pressed into an artificial sausage casing and coagulated by boiling in water for 30 minutes. Both samples were then tested for their organoleptic properties by a panel consisting of 24 persons of which 18 indicated a preference for the 2,3-dihydrofuran-3-one containing synthetic meat.

EXAMPLE 16

An Indonesian rice dish called nasi goreng was prepared from the following ingredients:

|  | G. |
|---|---|
| Rice | 1,000 |
| Cut onions | 625 |
| Pork | 300 |
| Red paprica | 80 |
| Tallow | 125 |
| Sodium chloride | 40 |
| Casein hydrolysate | 10 |
| Sambal (an Indonesian spicing) | 6 |

Water, 2 litres.

The rice was boiled for 25 minutes in water to which the salt and casein hydrolysate had been added. The pork was fried in the fat after which the onions, pepper and sambal were added and the mixture was fried until the onions turned golden yellow. Subsequently the dry cooked rice was added to the mixture and the mixture was fried under constant stirring and nasi goreng was obtained.

A sample for organoleptic testing was prepared from the thus obtained nasi goreng by adding to 1,000 g. nasi goreng 10 ml. water, whereas a second sample was prepared by adding to another 1,000 g. nasi goreng 10 ml. of an aqueous solution containing 1.15 mg. 2,5-dimethyl-4-hydroxy-2,3-dihydrofuran-3-one (M.P. 79.5–80.5° C.) per ml.

After heating both mixtures to the desired temperature they were tasted by a panel consisting of 36 persons. Twenty-seven members of the panel indicated a preference for the nasi goreng which contained the 2,3-dihydrofuran-3-one.

What is claimed is:

1. A foodstuff consisting essentially of a meat product or a meat simulating product and a 4-hydroxy-2,3-dihydrofuran-3-one of the general formula:

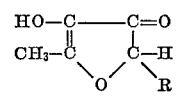

in which R represents —H or —CH₃.

2. A foodstuff as claimed in claim 1 in which R in the furanone represents —CH₃ and the quantity of the furanone present, calculated on the weight of ready-for-use foodstuff, is from 0.05 to 50 parts per million.

3. A foodstuff as claimed in claim 1 in which R in the furanone represents —H and the quantity of the furanone present, calculated on the weight of ready-for-use foodstuff, is from 0.5 to 100 parts per million.

4. A foodstuff as claimed in claim 1 in which the 4-hydroxy-2,3-dihydrofuran-3-one is added to the foodstuff in the form of a precursor.

5. A foodstuff in accordance with claim 1, wherein said foodstuff is a soup.

6. A method of flavoring a meat product or simulated meat product, comprising introducing an effective flavoring amount of a meat flavor composition consisting essentially of a 4-hydroxy-2,3-dihydrofuran-3-one of the general formula

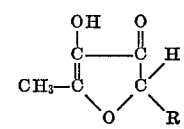

in which R represents —H or —CH₃ into the meat product or simulated product.

7. A method in accordance with claim 6, in which the amount of furanone added is from 0.05 to 50 parts per million based on the weight of ready foodstuff.

8. A method of flavoring a meat product or simulated meat product, comprising introducing into said product an effective flavoring amount of a 4-hydroxy-2,3-dihydrofuran-3-one of the general formula

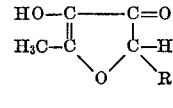

in which R represents H or CH₃, and one or more other substances selected from the group consisting of 5'-nucleotides, hydroxycarboxylic acids, dicarboxylic acids, and amino acids obtained by hydrolysis of proteins.

9. A method of flavoring a meat product or simulated meat product comprising introducing into said product an effective flavoring amount of a furanone as defined in claim 8, and another substance which is casein hydrolysate.

10. A method in accordance with claim 8 wherein said other substances are succinic acid and lactic acid, said acids being present in the ratios of 1:30 to 1:150 respectively.

11. A method in accordance with claim 8, wherein said effective flavoring amount is about 0.05 to about 50 parts per million based on the weight of said meat product or simulated meat product.

(References on following page)

References Cited

UNITED STATES PATENTS

| | | | |
|---|---|---|---|
| 2,918,376 | 12/1959 | May | 99—140 |
| 3,030,213 | 4/1962 | Tidridge | 99—140 X |
| 3,231,385 | 1/1966 | Ziro | 99—140 U X |
| 3,408,206 | 10/1968 | Yamazaki | 99—140 |
| 3,455,702 | 7/1969 | Willhalm | 99—140 |
| 2,928,740 | 3/1960 | Rosenthal | 99—17 |
| 3,503,758 | 3/1970 | Wada | 99—140 R |

OTHER REFERENCES

Dorothy B. Marsh, ed., "The Good Housekeeping Cook Book," 217 and 508, Rinehart, New York, 1949.

Rodin et al., J. Food Sci., 30(2), 280–5 (1965).

MORRIS O. WOLK, Primary Examiner

S. MARANTZ, Assistant Examiner

U.S. Cl. X.R.

99—124, 140 R, 140 N

Notice of Adverse Decision in Interference

In Interference No. 98,487 involving Patent No. 3,697,291, C. H. T. Tonsbeek, FURANONE MEAT FLAVOR COMPOSITIONS, final judgment adverse to the patentee was rendered Sept. 22, 1975, as to claims 1, 3, 5, 6 and 7.

[*Official Gazette March 23, 1976.*]